US012609910B2

(12) United States Patent
Schmieder et al.

(10) Patent No.: US 12,609,910 B2
(45) Date of Patent: Apr. 21, 2026

(54) UTILIZING SIMULATION NODE TAGS WITHIN NETWORK SIMULATIONS

(71) Applicant: Cisco Technology, Inc., San Jose, CA (US)

(72) Inventors: Ralph Schmieder, Karlsruhe (DE); Joseph Michael Clarke, Cary, NC (US); Justin G. Guagliata, Saint Louis, MO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 18/394,092

(22) Filed: Dec. 22, 2023

(65) Prior Publication Data

US 2025/0211573 A1      Jun. 26, 2025

(51) Int. Cl.
*H04L 9/40*          (2022.01)

(52) U.S. Cl.
CPC ...... *H04L 63/0263* (2013.01); *H04L 63/0218* (2013.01); *H04L 63/0236* (2013.01); *H04L 63/20* (2013.01)

(58) Field of Classification Search
CPC ............. H04L 63/0263; H04L 63/0218; H04L 63/0236; H04L 63/20
See application file for complete search history.

(56) References Cited

U.S. PATENT DOCUMENTS 10,243,926 B2 * 3/2019 Thubert .................. H04L 67/12
10,484,334 B1 * 11/2019 Lee ......................... H04L 67/30

11,729,146 B1 * 8/2023 Eyada ................... H04L 63/104
                                                              726/1
2006/0190231 A1   8/2006 Malloy et al.
2009/0249472 A1  10/2009 Litvin et al.
2015/0051893 A1   2/2015 Ratcliffe, III et al.
2017/0170988 A1 *  6/2017 Mazarick ................ H04L 47/78
2017/0230333 A1 *  8/2017 Glazemakers ...... H04L 63/0236
2017/0295141 A1 * 10/2017 Thubert .............. H04L 63/0209
2018/0309641 A1  10/2018 Wang et al.
2019/0097975 A1 *  3/2019 Martz ................. H04L 63/0281
2021/0320903 A1 * 10/2021 Kalaycilar .......... H04L 63/0236
2022/0210126 A1 *  6/2022 Keiser ................... H04L 63/104

OTHER PUBLICATIONS

Google Cloud, "Tags for Firewalls," Cloud Firewall, https://cloud.google.com/firewall/docs/tags-firewalls-overview, retrieved from the Internet on Oct. 25, 2023, 7 Pages.
Google Cloud, "Use Tags for Firewalls," Cloud Firewall, https://cloud.google.com/firewall/docs/use-tags-for-firewalls, retrieved from the Internet on Oct. 25, 2023, 9 Pages.

* cited by examiner

*Primary Examiner* — Cheng-Feng Huang
(74) *Attorney, Agent, or Firm* — Edell, Shapiro & Finnan, LLC

(57)          ABSTRACT

Provided herein are techniques that may facilitate configuring and utilizing tags for simulation nodes included in network simulations. In one example, a method is provided that may include obtaining, by a controller of a network simulation, a tag for a simulation node included in the network simulation, wherein the tag comprises: a first tag field indicating an action that is to be performed by the controller as part of the network simulation on behalf of the simulation node; and one or more second tag fields indicating parameters for the action that is to be performed by the controller; and performing the action by the controller as identified via the first tag field based on the parameters indicated in the one or more second tag fields.

20 Claims, 6 Drawing Sheets

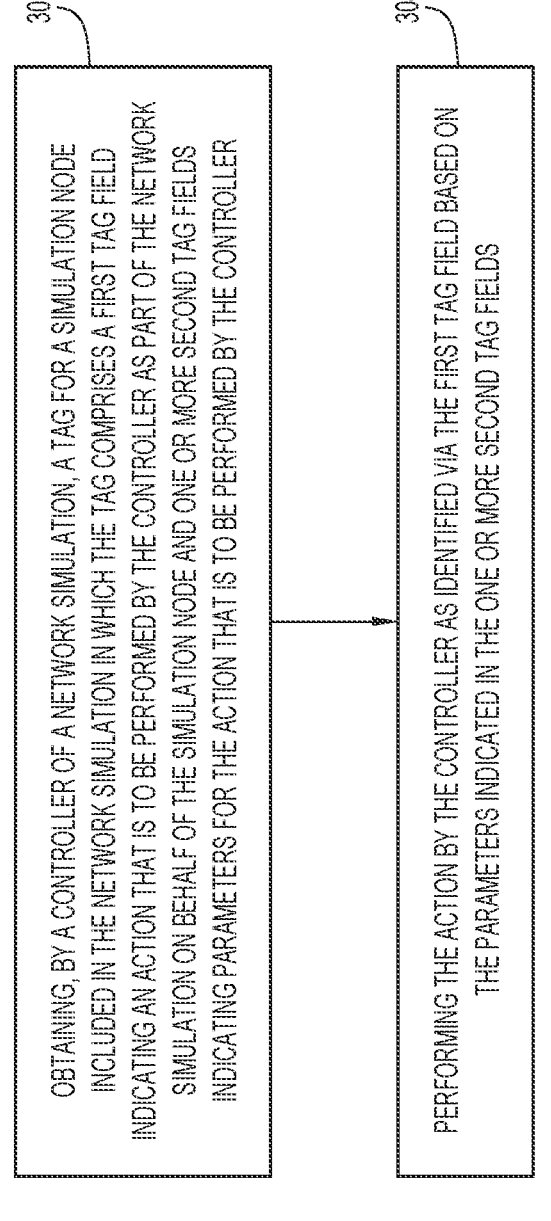

302

OBTAINING, BY A CONTROLLER OF A NETWORK SIMULATION, A TAG FOR A SIMULATION NODE INCLUDED IN THE NETWORK SIMULATION IN WHICH THE TAG COMPRISES A FIRST TAG FIELD INDICATING AN ACTION THAT IS TO BE PERFORMED BY THE CONTROLLER AS PART OF THE NETWORK SIMULATION ON BEHALF OF THE SIMULATION NODE AND ONE OR MORE SECOND TAG FIELDS INDICATING PARAMETERS FOR THE ACTION THAT IS TO BE PERFORMED BY THE CONTROLLER

304

PERFORMING THE ACTION BY THE CONTROLLER AS IDENTIFIED VIA THE FIRST TAG FIELD BASED ON THE PARAMETERS INDICATED IN THE ONE OR MORE SECOND TAG FIELDS

COMPUTING DEVICE

CONTROL LOGIC — 420

I/O — 416

I/O

I/O — 432

NEWORK PROCESSOR UNIT(s) — 430

STORAGE — 406

MEMORY ELEMENT(s) — 404

PROCESSOR(s) — 402

408

400

UTILIZING SIMULATION NODE TAGS WITHIN NETWORK SIMULATIONS

TECHNICAL FIELD

The present disclosure relates to network simulation tools and services.

BACKGROUND

When working with simulated network devices within a simulated network, it is often desirable to interconnect the simulated network devices for operational purposes. However, such simulated network devices often have limited accessibility from outside a network simulation; thus, it can be difficult to configure or access simulated network devices that are operating in a network simulation.

BRIEF DESCRIPTION OF THE DRAWINGS

FIG. 3 is a flow diagram depicting a method according to an example embodiment.

DETAILED DESCRIPTION

Overview

Figure 1A:
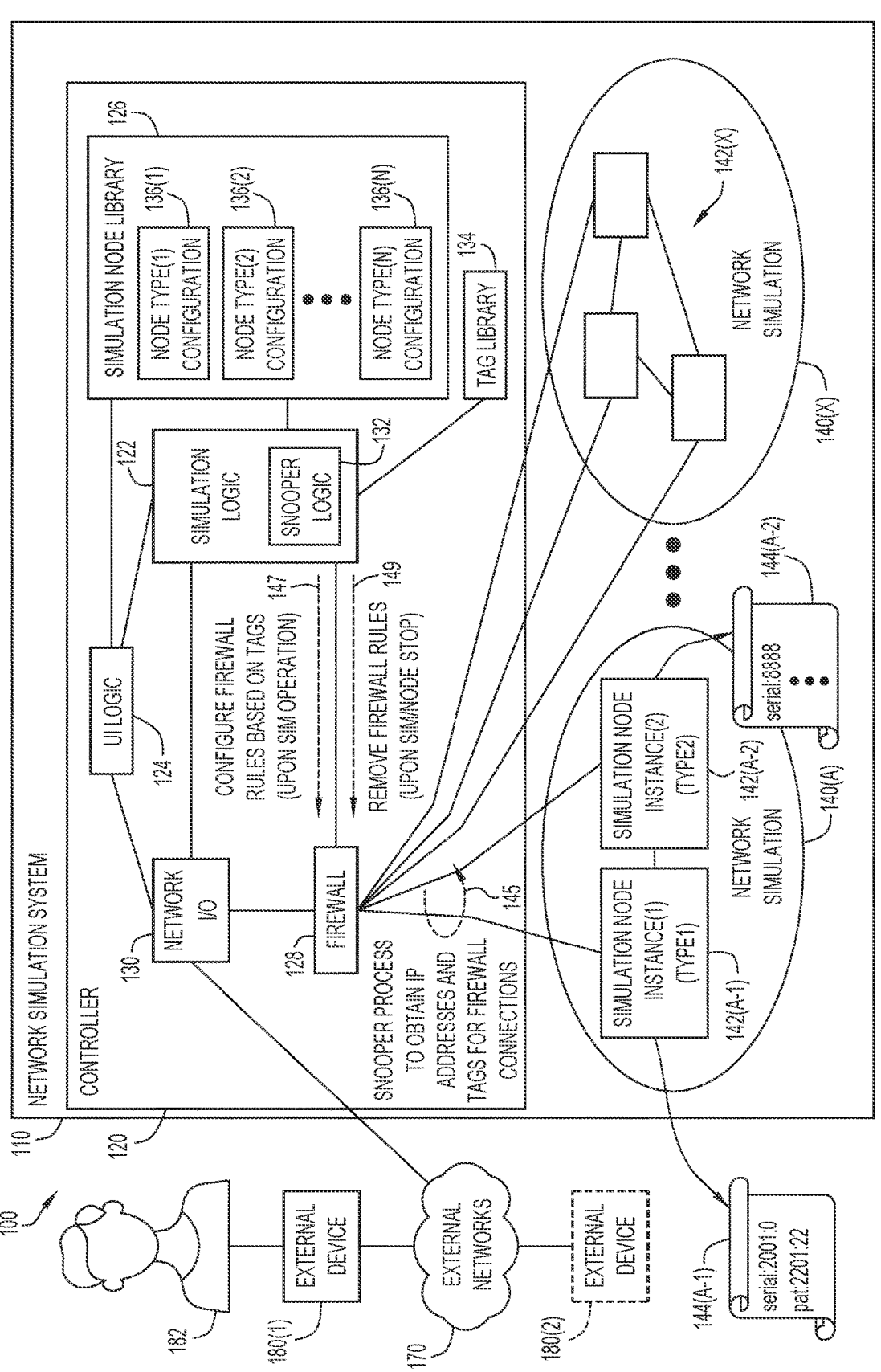
FIG. 1A is a block diagram of a system in which simulation node tags may be utilized for network simulations, according to an example embodiment.

Embodiments herein may provide techniques for configuring and utilizing tags for simulation nodes included in network simulations in which the tags can carry a semantic meaning or instruction that defines an action or command to be performed by a network simulation controller on behalf of simulation nodes configured with or 'carrying' such tags. Tags provided in accordance with embodiments may be configured with an action or command tag portion or field and one or more argument or parameter tag portions or fields that can be used to instruct the infrastructure or network simulation system operating a virtual network simulation to implement specific behaviors on behalf of simulation nodes carrying such tags.

In one nonlimiting example, a tag configured for a simulation node can be used to open ports of a firewall provided via a network simulation system during the lifetime of the simulation node (e.g., for the time during which the node is included/operated in a given network simulation). Other tags can be configured for simulation nodes in accordance with embodiments herein to facilitate dynamic behaviors that may be performed on behalf of such nodes, such as, for example, to discover and dynamically translate available services for a given simulation node in order to configure one or more rules for a simulation firewall and/or perform one or more other actions or commands on behalf of the simulation node.

In one instance, a method is provided that may include obtaining, by a controller of a network simulation, a tag for a simulation node included in the network simulation, wherein the tag comprises: a first tag field indicating an action that is to be performed by the controller as part of the network simulation on behalf of the simulation node; and one or more second tag fields indicating parameters for the action that is to be performed by the controller; and performing the action by the controller as identified via the first tag field based on the parameters indicated in the one or more second tag fields.

Example Embodiments

Network simulation tools provide for the ability to simulate behaviors of both overall operation of a (simulated) network configuration as well as behavior of (simulated) network devices included in the network configuration. When working with network devices inside of a simulated network, a user can connect simulated network devices together with each other within the simulated network and, in some instances, may desire to connect to the simulated network devices via an external network for operational purposes (e.g., for network management purposes, for device management purposes, etc.).

However, simulated network devices configured within a network simulation may not be directly accessible from outside the network simulation environment but rather often connect to external networks via some form of a network address translation (NAT) or firewall device such that management of a simulated network device can be facilitated through the firewall via a console (e.g., a serial or Video Graphics Array (VGA) port) provided for the simulated network device. Such firewall access typically involves manual configuration of the firewall (e.g., by a network simulation user) for each simulated network device for which access may be sought.

In some instances, a bridged or shared network interface of the network simulation environment can allow for simulated network devices to directly access an external (physical network), but this often involves the use of more physical or routable Internet Protocol (IP) addresses than may be available and does not solve the direct console access issue.

In order to address such issues, embodiments herein provide for the ability to facilitate, among other features, access for simulated network devices through the use of one or more tags that can be configured for the simulated network devices in which the tags carried by the simulated network devices can include semantics (e.g., configured via delimited short text strings) that can be obtained by a network simulation controller and used by the controller to configure, among other features as discussed for embodiments herein, firewall rules for the simulated network devices to enable the simulated network devices to be accessed via one or more external networks. Through embodiments as discussed herein, the use of a tagging structure may allow for specifying network access for simulated network devices, while also advantageously provided for the ability to perform other actions/operations for a network simulation/simulated network devices through other filtering, searching, and/or grouping characteristics that may be facilitated by simulated network device tags.

Figure 1B:
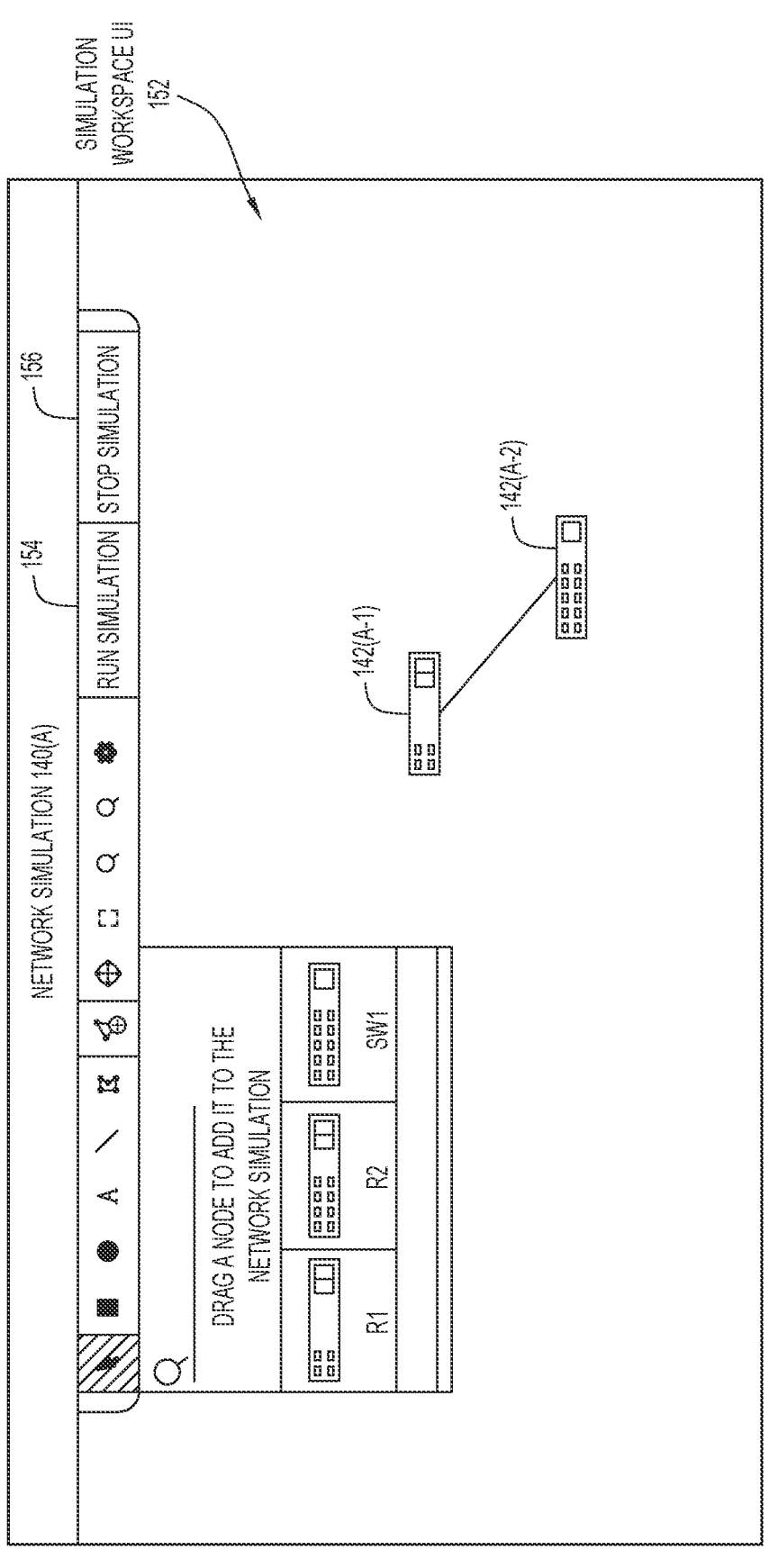
FIG. 1B is a diagram illustrating example details for an example user interface screen that may be utilized for configuring and operating a network simulation, according to an example embodiment.
Figure 1C:
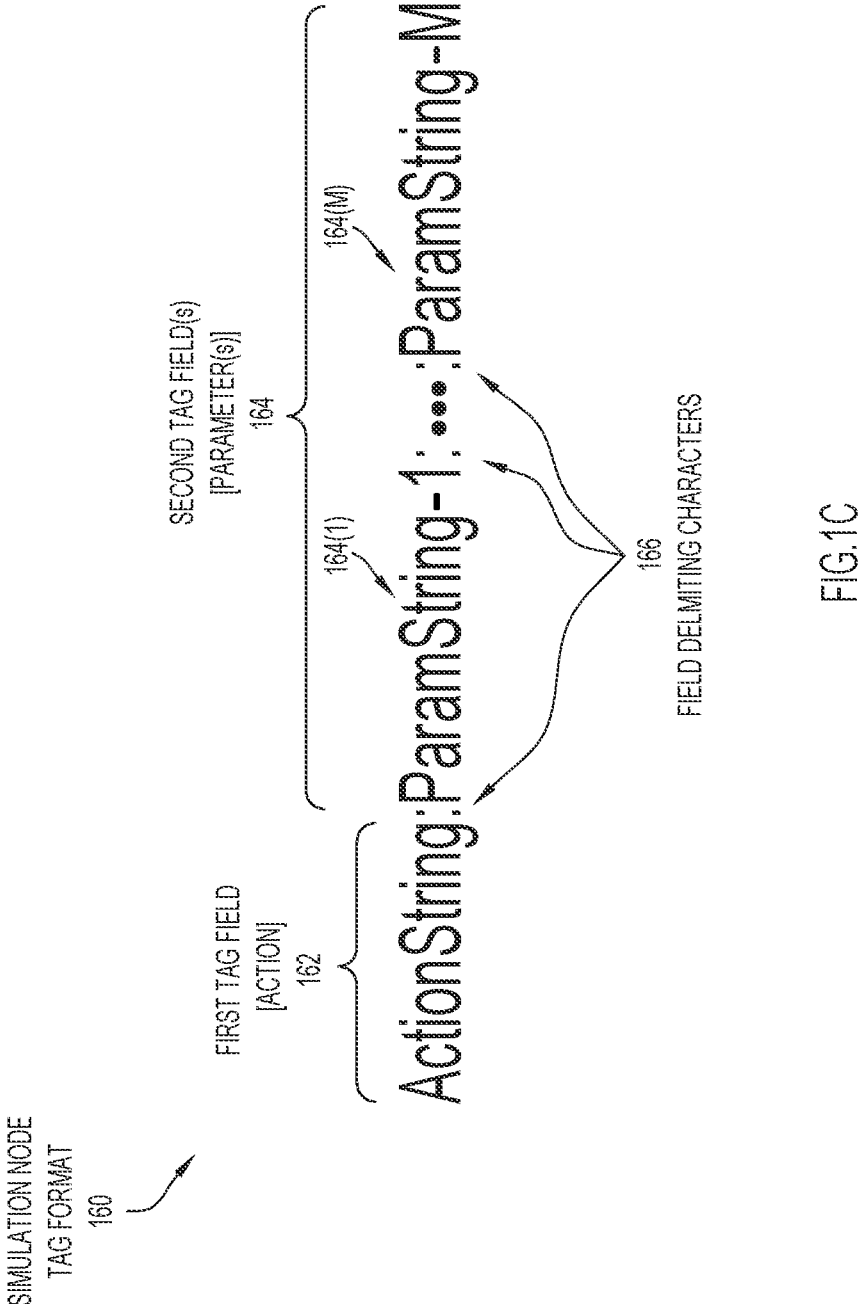
FIG. 1C is a diagram illustrating an example simulation node tag format, according to an example embodiment.

Referring to FIG. 1A, FIG. 1A is a block diagram of a system 100 system in which simulation node tags may be utilized within a network simulation environment, according to an example embodiment. FIG. 1B is a diagram illustrating example details for an example user interface (UI) screen 150 that may be utilized for configuring and operating a network simulation, according to an example embodiment. FIG. 1B is discussed in relation to features discussed for FIG. 1A. FIG. 1C is a diagram illustrating an example simulation node tag format 160 that may be utilized in accordance with embodiments herein and is discussed in relation to features discussed for FIGS. 1A and 1B.

As shown in FIG. 1A, system 100 may include a network simulation system 110 that can interface with one or more external devices, such as external devices 180(1) and 180(2) via one or more external networks 170. As shown in FIG. 1A, a user 182 is illustrated, which may operate network simulation system 110 via external device 180(1) (e.g., a computing device, such as a laptop, desktop computer, or the like).

As illustrated in FIG. 1A, network simulation system 110 may include a controller 120 through which one or more network simulations, such as network simulation 140(A) through network simulation 140(X), may be configured and operated. In at least one embodiment, controller 120 may include simulation logic 122 including snooper logic 132, user interface (UI) logic 124, a simulation node library 126, a firewall 128, network input/output (I/O) interfaces, shown in FIG. 1A as network I/O 130, and a tag library 134.

Simulation node library 126 may include configuration information that defines each a number of different types of simulation nodes that can be incorporated into a given network simulation in which each of the simulation nodes may be associated with a certain type of network device, such as a switch, a router, a gateway, an optical transmit/receive module, a load balancer, an authentication element, a network interface card, including any variations thereof (e.g., 4-port, 8-port, etc.) and/or any other type of network element that may be utilized within a network simulation. In at least one embodiment, as shown in FIG. 1A, a node type(1) configuration 136(1) can be provided for a first type of simulation node, a node type(2) configuration 136(2) can be provided for a second type of simulation node, and so on for any 'N' types of simulation nodes (node type(N) configuration 136(N)).

Tag library 134 can be configured to include a library or database of different types of tags/tag formats that can be carried by and/or configured for simulation nodes included in one or more network simulations and the corresponding action(s) or command(s) that each tag/tag format is to trigger to be performed by the controller 120 on behalf of a given simulation node configured with one or more tags. Other features of tag library 134 are discussed in further detail herein, below.

Each of the simulation logic 122 including snooper logic 132, user interface logic 124, simulation node library 126, firewall 128, and network I/O 130 may interface and operate together in any appropriate manner in order to facilitate configuring and operating one or more network simulations 140(A)-140(X), by one or more users, such as user 182 via external device 180(1), in accordance with embodiments herein. In various embodiments, network I/O can be configured as one or more Ethernet port(s), Fibre Channel ports, any other I/O port(s) now known or hereafter developed and may include and/or interface with one or more the network processor units (not shown) provided for controller 120 to provide any suitable interfaces for receiving, transmitting, and/or otherwise communicating data and/or information within system 100. Generally, firewall 128 may be configured/operate to inspect/monitor traffic communication between network simulation system 110 (e.g., controller 120, one or more network simulations, simulation nodes, etc.) and one or more external networks/devices in order to protect network simulation system 110 from attacks, exploits, worms, and/or any other security threats. As discussed in further detail herein, in some embodiments, firewall 128 can be configured with various firewall rules on behalf of simulation nodes based on tag(s) carried by simulation nodes.

Broadly, a node configuration for a given type of simulation node, as provided for/included within simulation node library 126, can define default parameters and/or operational behavior for the given type of simulation node. When a particular instance of a given type of simulation node is included in a particular network simulation, additional parameters can be configured for the particular simulation node instance, including, but not limited to, an Internet Protocol (IP) address and, in accordance with embodiments herein, one or more tags that can be used to define one or more actions that are to be performed on behalf of the particular simulation node instance for the particular network simulation.

As generally illustrated via FIG. 1B, configuration and operation of a given network simulation, such as network simulation 140(A) can involve a user, such as user 182, dragging and dropping an instance of a given simulation node type into a simulation workspace UI 152 of the user interface screen 150, as shown in FIG. 1B, which can be facilitated via UI logic 124 of controller 120.

Consider an illustrative example of configuring and operating a network simulation, such as for configuring and operating network simulation 140(A). The example regarding network simulation 140(A) is provided for illustrative purposes only and is not meant to limit the broad scope of embodiments herein. For example, as illustrated in FIGS. 1A and 1B, the user 182 may drag and drop an instance of node type(1) into the network simulation 140(A), shown as simulation node instance(1) 142(A-1), and may also drag and drop an instance of node type(2) into the network simulation 140(A), shown as simulation node instance(2) 142(A-2). Within the simulation workspace UI, the user 182 can connect the two simulation node instances together (e.g., generally illustrated via the line interconnecting simulation node instance(1) 142(A-1) and simulation node instance(2) 142(A-2)).

The controller 120, via simulation logic 122 and snooper logic 132, can facilitate interconnection between each of the simulation node instances configured for network simulation 140(A) and firewall 128/network I/O 130 for operation (e.g., at runtime) of the network simulation 140(A). In a similar manner, any number of simulation node instances may be configured for any other network simulations that may be configured/operated via network simulation system 110, such as simulation node instances 142(X) that may be configured for network simulation 140(X).

As referred to herein, the terms 'simulation node instance' and 'simulation node' (and any variations thereof) can be used interchangeably to refer to an instance of a type of simulation node that has been configured for operation within a given network simulation.

As noted above, upon placing (dragging and dropping) a given simulation node instance within the network simulation, additional parameters can be configured for the particular simulation node instance, including, but not limited to, an IP address and, in accordance with embodiments herein, one or more tags that can be used to define one or more actions that are to be performed on behalf of the particular simulation node instance for the particular network simulation.

In accordance with embodiments herein, simulation node tags configured for a particular simulation node included in a particular network simulation may provide for the ability to direct the controller 120, via simulation logic 122 and, in some instances, snooper logic 132, to perform one or more actions or commands, collectively referred to herein as 'actions', on behalf of the particular simulation node through operation of the particular network simulation. Broadly, simulation node tags provided in accordance with embodiments herein may comprise of a combination of short text strings, separated by one or more delimiting characters (e.g., tag=[String1:String2: . . . : String-M], in which the delimiting characters ':' are used to separate the text strings) that can be configured for one or more simulation nodes of a network simulation. Tags provided for simulation nodes in accordance with embodiments herein may have a fixed format with a specific syntax or semantics that can be used trigger actions to be performed by the controller 120 on behalf of simulation nodes configured with (also referred to herein as 'carrying') one or more tags. Tags provided in accordance with embodiments may be configured with an action or command tag portion or field and one or more argument or parameter tag portions or fields such that the tags that can be used to instruct the network simulation system 110 operating a virtual network simulation to implement specific behaviors. Text strings that may be utilized/configured in accordance with embodiments may include any combination of alphabetical and/or numerical characters.

With reference to FIG. 1C, an example simulation node tag format 160 is illustrated, according to an example embodiment. As shown in FIG. 1C, the simulation node tag format 160 may comprise a first tag field 162 that includes a first text string (e.g., 'ActionString', as shown in FIG. 1C) in which the first tag field identifies or indicates an action that is to be performed by the controller 120 on behalf of a particular simulation node carrying a particular tag. Further, the simulation node tag format 160 may include one or more second tag fields 164, shown in FIG. 1C as a first second tag field 164(1) thru an 'M' number of second tag fields 164(M), in which each second tag field 164(1)-164(M) can be used to identify or indicate parameters that are to be utilized by the controller 120 for performing the action as indicated in the first tag field 162. Each second tag field 164(1)-164(M) can include a corresponding text string (e.g., 'ParamString-1'—'ParamString-M'). Each tag field (text string) for the simulation node tag format 160 can be separated by a field delimiting character, such as field delimiting characters 166, as shown in FIG. 1C. The field delimiting characters 166 as shown in FIG. 1C are colon ':' characters, however, it is to be understood that any appropriate delimiting characters or schemes can be utilized to separate tag fields of a simulation node tag in accordance with embodiments herein (e.g., percent characters '%', line characters "|", 'at' characters '@', etc.).

In one instance, the first tag field 162 may be considered a static part or portion of a given tag and the second tag fields 164 may be considered variables of the static portion of the tag that can be separated via delimiter(s) (delimiting characters 166).

In at least one embodiment, tag library 134 can be configured with each of a plurality of tags/tag formats that can be utilized within network simulation system 110 and corresponding actions or commands that are to be triggered by controller 120 on behalf of a simulation node carrying and/or configured with a corresponding tag. In at least one embodiment, the tag library 134 can be used by the controller 120, via simulation logic 122 and/or snooper logic 132 in order to interpret tag(s) (fields of the tag(s)) configured for a given simulation node in order to perform one or more actions or commands on behalf of the simulation node.

In at least one embodiment, the tag library 134 can be configured with tag generation rules that by can be used by the controller 120, via simulation logic 122 and/or snooper logic 132, in order to automatically generate one or more "soft" tag(s) for a given simulation node based on analyzing traffic, services, and/or the like utilized during operation of a given simulation node in which the "soft" tag(s), can also be used by the controller 120 in order to perform one or more actions of commands on behalf of the simulation node for which a "soft" tag has been generated.

As shown in FIG. 1A, one or more simulation node tags 144(A-1) can be configured for simulation node instance 142(A-1) and one or more simulation node tags 144(A-2) can be configured for simulation node instance 142(A-2), which are discussed in further detail herein, below. Simulation node tags 144(A-1) and 144(A-2) may be considered "hard" tags configured for corresponding simulation nodes 142(A-1) and 142(A-2), as compared to "soft" tags that may be configured for simulation nodes during operation of a given network simulation, as discussed in further detail herein.

Actions performed by the controller 120 on behalf of a particular simulation node may encompass any actions/commands that may facilitate operation of a simulation node/network simulation in accordance with embodiments herein. In one example, a user, such as user 182, can initiate operation of a network simulation, such as network simulation 140(A), via selection of a UI element 154 (e.g., button, etc. labeled 'Run Simulation', for example) provided via UI screen 150, as shown in FIG. 1B.

In at least one embodiment, simulation node tags provided in accordance with embodiments herein can be used to control the underlying firewall 128 for programmatic access to simulation nodes carrying such tags. Thus, in at least one embodiment, different types of firewall rule tags configured for simulation nodes may allow for manipulating the firewall 128 or, more specifically, rules configured for the firewall 128 on behalf of simulation nodes carrying such firewall rule tags.

In at least one embodiment, a particular tag format (e.g., as configured via tag library 134) can be utilized for configuring a first type of firewall rules so that inbound/outbound connections to/from otherwise firewalled services/nodes may be provided for a network simulation, for example, to facilitate connections/communications between simulation nodes and external devices (e.g., applications, services, etc.) that may be connected to the simulation node system 110 via external networks 170 and/or utilized through operation of one or more network simulations.

In at least one embodiment, a particular tag format can be used for a particular tag to trigger controller 120 (e.g., via simulation logic 122) to configure a port address translation (PAT) type of firewall rule for firewall 128 on behalf of a particular simulation node carrying the particular tag. In at least one embodiment, a particular tag for triggering configuration of a port address translation rule for firewall 128 on behalf of a particular simulation node can be configured with a first tag field set to 'pat' and second tag fields indicating an outside port number (of network I/O 130 for controller 120) and an inside port number (of firewall 128)

connected to the particular simulation node, in a format such as 'pat:outsideport:insideport'.

For example, as shown in FIG. 1A, a simulation node tags 144(A-1) provided for simulation node 142(A-1) can include a PAT firewall rule tag configured as 'pat:2201:22' in which '2201' defines an outside port of network I/O 130 and '22' defines an inside port that is to interface with simulation node 142(A-1). To facilitate configuration of the rule for firewall 128 during operation of network simulation 140(A) (e.g., upon the user 182 initiating operation of the simulation via UI element 154), simulation logic 122, via snooper logic 132, can perform a snooper process, as generally illustrated at 145, in order to learn or obtain the IP address of simulation node instance 142(A-1) connected to firewall 128 on a network address translated (NATed) network subnet, along with any tags configured for simulation node instance (e.g., tags 144(A-1)). Through the snooper process, controller 120/simulation logic 122 determines the source and destination IP addresses for the firewall 128 connection involving simulation node instance 142(1-A) (e.g., source IP=controller/firewall and destination IP=simulation node instance 142(A-1)) that is to be associated with a firewall rule configured for firewall 128 based on the tag 'pat:2201:22' on behalf of simulation node instance 142(A-1). Consider for one illustrative example that a 192.0.2.0/24 IP address subnet range is used for outside network simulation system 110 and a 10.0.0.0/8 IP address subnet range for inside network simulation system. Say, for example, that the network simulation controller 120 has an IP address of 192.0.2.1 and a simulation node on the inside (e.g., simulation node 144(A-2) running in network simulation 140(A)) has an IP of 10.0.0.1. In order to configure a PAT rule for firewall 128 involving mapping a port tcp/22 of the simulation node to a port 20022 on the outside, a corresponding to 'pat:tcp:20022:22' may be configured such that, through the snooper process, a PAT firewall rule can be configured for firewall 128 that enables a user on the outside to 192.0.2.1, port tcp/20022, which could be translated to facilitate connection to port tcp/22 of the simulation node.

Broadly in accordance with embodiments herein, when a corresponding 'pat' tag is found for a simulation node where the node's IP address has been learned via the snooper process provided via simulation logic 122/snooper logic 132, the controller 120 can configure (e.g., via one or more application programming interface (API) calls, processes, or the like) a specific port address translation rule to the firewall 128 on behalf of the simulation node such that the port address translation rule translates the inside address to the firewall 128 address, as generally illustrated at 149.

Other port address translation rules may be provided in accordance with embodiments herein. In at least one embodiment, a particular tag for triggering configuration of a port address translation rule for firewall 128 on behalf of a particular simulation node can be configured with a first tag field set to 'pat' and second tag fields a protocol for the rule, along with additional fields indicating an outside port and an inside port to be configured for the firewall rule, in a format such as 'pat:protocol:outsideport:insideport'. In one example, the protocol can be set to Transmission Control Protocol (TCP), such as 'pat:tcp:outsideport:insideport' or can be set to User Datagram Protocol (UDP), such as 'pat:udp:outsideport:insideport'. In one instance, for example, a tag can be configured as 'pat:tcp:1334:5467' in which 'pat' is the static part of the tag specifying a port address translation firewall rule that defines the action to be performed by the controller 120 (i.e., configure the firewall 128 with a rule), 'tcp' defines the protocol to use, '1334' is the first argument defining the outside port and '5467' is the second argument defining the inside port for the rule.

Other variations for port address translation tags/formats can be envisioned. In some instances, the order of the outside port and the inside port can be switched, so long as controller 120 is configured to identify the formatted order for the ports in order to facilitate configuration of firewall 128.

Other types of firewall rules may be configured through the use of tags provided for simulation nodes in accordance with embodiments herein. In at least one embodiment, a particular tag format can be utilized to trigger controller 120 (e.g., via simulation logic 122) to configure an inbound permit or serial access type of rule for firewall 128 (e.g., at 147) to allow or facilitate access to virtual machine (VM) devices, such as consoles, virtual network computing (VNC) screens, and/or the like (sometimes referred to as 'teletypewriter' (TTY) screens/interfaces) that may be accessed/provided by certain simulation nodes (e.g., within the network simulation system 110 and/or outside/external to the system). Such an inbound permit or serial access rule configured for firewall 128 on behalf of a given simulation node may also be referred to as a 'hole' configured for firewall 128 and can carry port and device information such that a corresponding inbound permit rule tag can be used to instruct controller 120 to configure the firewall 128 so that direct access to a console or a VNC port is provided for the given simulation node carrying such a tag. For example, such an inbound permit or access rule can be used to create a 'hole' in the firewall 128 to do the NAT, then providing an open, outside port on the network stack (network I/O) side to accept the connection. In this manner, such a firewall rule may facilitate tunneling traffic (e.g., TCP) to a socket that is connected to a serial device.

In at least one embodiment, a particular tag for triggering configuration of a serial access rule for firewall 128 on behalf of a particular simulation node carrying the tag can be configured with a first tag field set to 'serial' and second tag field(s) indicating an outside port number that is to be opened for/via firewall 128 and, optionally, a port number corresponding to the terminal port on the node carrying the tag in a format such as 'serial:port:terminalport'.

For example, as shown in FIG. 1A, a simulation node tags 144(A-1) provided for simulation node 142(A-1) can include an inbound permit firewall rule tag configured as 'serial:2001:0' in which '2001' defines a port of network I/O/firewall 128 that is to be opened/tunneled through firewall 128, and 'O' defines the terminal port of simulation node 142(A-1).

In some embodiments, an inbound permit tag can be configured with only one port such that the terminal port of the simulation node is assumed to be defined as port '0'. For example, as shown in FIG. 1A, a simulation node tags 144(A-2) provided for simulation node 142(A-2) can include an inbound permit firewall rule tag configured as 'serial:8888' in which '8888' defines a port of firewall 128 that is to be opened and the terminal port of simulation node 142(A-2) is inferred to correspond to port '0'. Other inbound permit tags may be configured, such as 'serial:port:linenum', 'vnc:outsideport', or the like through which serial and VNC connections could be abstracted to a TCP port opened by the firewall 128 on the outside of the controller (network I/O 130) that maps a TCP port to an internal socket, which may be a file, a UNIX domain socket, another network socket, and/or the like.

Thus, during operation of a network simulation, when such an inbound permit tag is found/obtained for a given simulation node (e.g., via the snooper process performed via simulation logic 122/snooper logic 132), the controller 120 can program the firewall 128 such that a port (port number) specified via the tag is opened on the firewall 128. Once configured, when an application (e.g., console, service, etc.) connects to the port on the firewall 128, the connection can be accepted and spliced/connected to the terminal port of the given simulation node (e.g., the serial port facilitating VNC/VGA access for the node). Thus, in contrast to PAT tags that open up a port on the firewall 128 to accept packets, which are then forwarded to the given IP address/port towards a given simulation node running "inside" the network simulation system 110, for VNC/serial tags, a hole is opened in the firewall 128. However, the connection for such VNC/serial tags is not forwarded, but rather terminated on the simulation controller 120/tunneled to a simulation node. As the simulation controller 120, via simulation logic 122, is in charge of the connections to serial and "display" devices (VNC) attached to the simulation nodes running inside of network simulations, the controller 120 can accept these connections and provide multiplexed access to these devices, which can allow multiple accesses to the same device via the hole in the firewall. In a physical network, such management access would be an "out of band" access to manage simulation devices that does not require any IP connectivity to/from the device itself. Any combination of PAT and/or TTY rules (which can be referred to as 'PATty' rules) can be configured for firewall 128 in accordance with embodiments herein.

The rules that are programmed into the firewall 128 of the controller 120 for operation of a given network node/network simulation are removed from the firewall 128 when the given simulation node of the given network simulation stops and only live for the duration/lifetime of the node within the given network simulation. For example, when the user 182 stops network simulation 140(A) and/or removes a given simulation node 142(A-1) or 142(A-2) from the network simulation, any rules configured for firewall 128 corresponding to the stopped/removed node(s) are to be removed from firewall 128 by the controller 120 (e.g., via simulation logic 122), as generally shown at 149.

In one example, a user, such as user 182, can stop operation of a network simulation, such as network simulation 140(A), via selection of a UI element 156 (e.g., button, etc. labeled 'Stop Simulation', for example) provided via UI screen 150, as shown in FIG. 1B.

Embodiments herein can be extended to other simulation environments, for example, for environments in which node VMs on different computes of a network simulation cluster may be connected to external connectors, which can all be terminated/centralized on the controller 120. For example, access to console and VNC devices on different computes can utilize techniques as described herein by leveraging device multiplexing within network simulation system 110 (where all consoles/VNC devices are accessible via a central dispatcher running on the controller 120). Therefore, virtual devices can run within a simulation on other nodes in a simulation cluster, but with external endpoints terminating on the controller. This can be facilitated by a common fabric provided via network simulation system 110 (e.g., via network I/O 130, firewall 128, and simulation logic 122) that facilitates connecting nodes and providing interfaces that facilitate connections to external endpoints (as well as the console and VNC socket for those nodes) that can be plumbed or connected back to the controller.

In addition to providing a tag for a simulation node that specifies a particular port address translation rule and includes the specific ports numbers associated with the translation, in at least one embodiment, a particular tag format can include a first tag field set to 'pat' and a second tag field set to 'auto', in a format such as 'pat:auto', which can be used to trigger instructing the underlying virtual network fabric to analyze or learn, via snooper logic 132, available protocols that may be utilized by a given simulation node in order to create dynamic port address translation entries/rules for firewall 128. Thus, an 'auto' tag can be used to discover and dynamically translate available protocols/services for a given simulation node. Upon learning the available protocols for a given simulation node, one or more "soft" tags can be generated for the node (e.g., by simulation logic 122/snooper logic 132 via tag generation rules defined via tag library 134) such that corresponding firewall rules for protocols associated with a given simulation node can be programmed for firewall 128.

Such soft tags, generated by simulation logic 122/snooper logic 132, may be considered transient in nature, as opposed to other "hard" tags that can be specifically configured for simulation nodes through simulation workspace UIs, such as tags 144(A-1) that may be configured for simulation node instance(1) 142(A-1) and tags 144(A-2) that may be configured for simulation node instance(2) 142(A-2).

Thus, in comparison to hard tags specifically configured for simulation nodes, soft tags, that can be generated for simulation nodes based on runtime/operational analysis of the nodes/traffic associated therewith may be considered to be transient in nature, configured, for example, on behalf of a given simulation node automatically upon learning a protocol to be utilized by the node. During operation, a simulation node tagged with a 'pat:auto tag can be used to instruct snooper logic 132 to sniff for traffic associated with the node (e.g., based on the IP address for the node) that may be flowing inside the virtual topology and have a server endpoint on the tagged simulation node in order to determine firewall rules to be configured for the simulation node.

Such dynamic soft tags can be extended to facilitate other operations. For example, in one embodiment, a tag such as 'pat:auto: discover' can be specified for a simulation node that can trigger the controller 120, via simulation logic 122/snooper logic 132, to perform a network mapping port scan of the simulation node to discover services associated with the simulation node in order to create soft tags/firewall rules for the discovered services.

Soft tags provided through embodiments herein may be generated through a variety of mechanisms (e.g., traffic analysis, port scanning, at service creation, upon detecting certain API calls, etc.) and may be used to convey that a translation was created on a specific destination port. Providing tagging in such a dynamic manner may allow a user to both understand what is being translated, as well as being able to use tags in common grouping, searching, and filtering interfaces.

Simulation node tags (e.g., defined per tag library 134) may be used to direct other actions/commands, beyond the configuration of firewall rules, in accordance with embodiments herein. For example, in at least one embodiment, semantic tags can be configured to facilitate VM placement for simulation nodes providing/having such VMs. In at least one embodiment, a particular tag format can be specified (e.g., per tag library 134) as 'placement: specific-compute-name' name in which the first tag field being set to 'placement' indicates a VM placement or instantiation configuration and at least one second tag field can be set to the compute name/resource/etc. that specifies the specific compute resource location (e.g., processor, core, memory, etc.) at which the VM is to be instantiated.

In at least one embodiment, a particular tag format can be specified (e.g., per tag library 134) as 'launch: temporal-information' in which the first tag field being set to 'launch' indicates a launch sequence tag that is to be used to indicate a time at which a given simulation node/VM is to be launched for a network simulation and at least one second tag field can be set to indicate temporal indicating when the simulation node/VM is to be launched or instantiated for the network simulation. In at least one embodiment, a 'temporal-information' tag field may be set to indicate an 'early' or 'late' launch of a simulation node/VM for a given network simulation. In at least one embodiment, a 'temporal-information' tag field may be set to a specific offset/start time value that can be used to indicate when a given simulation node/VM is to be launched, relative to the start of a given network simulation. In at least one embodiment, 'temporal-information' tag fields can be set to a priority value, such as 'launch-priority: value' in which the 'value' field can be set to a numerical value indicating the priority for launching a given simulation node/VM for a given simulation (e.g., set to '100' indicating a highest priority or any other value that can be used to indicate high/low launch priority).

It is to be understood that any tag formats and corresponding actions/commands, as well as any tag generation rules, can be configured for tag library 134 for use in conjunction with network simulations that may be configured for network simulation system 110. The example tag formats, and corresponding actions/commands as discussed herein are provided for illustrative purposes and are not meant to limit the broad scope of the teachings of the present disclosure. Virtually any tag formats and corresponding actions/rules and/or any tag generation rules can be configured for a library or database of tags and/or rules that may be configured for a network simulation system, such as tag library 134 configured for network simulation system 110, and, thus, are clearly within the scope of the teachings of the present disclosure.

Figure 2:
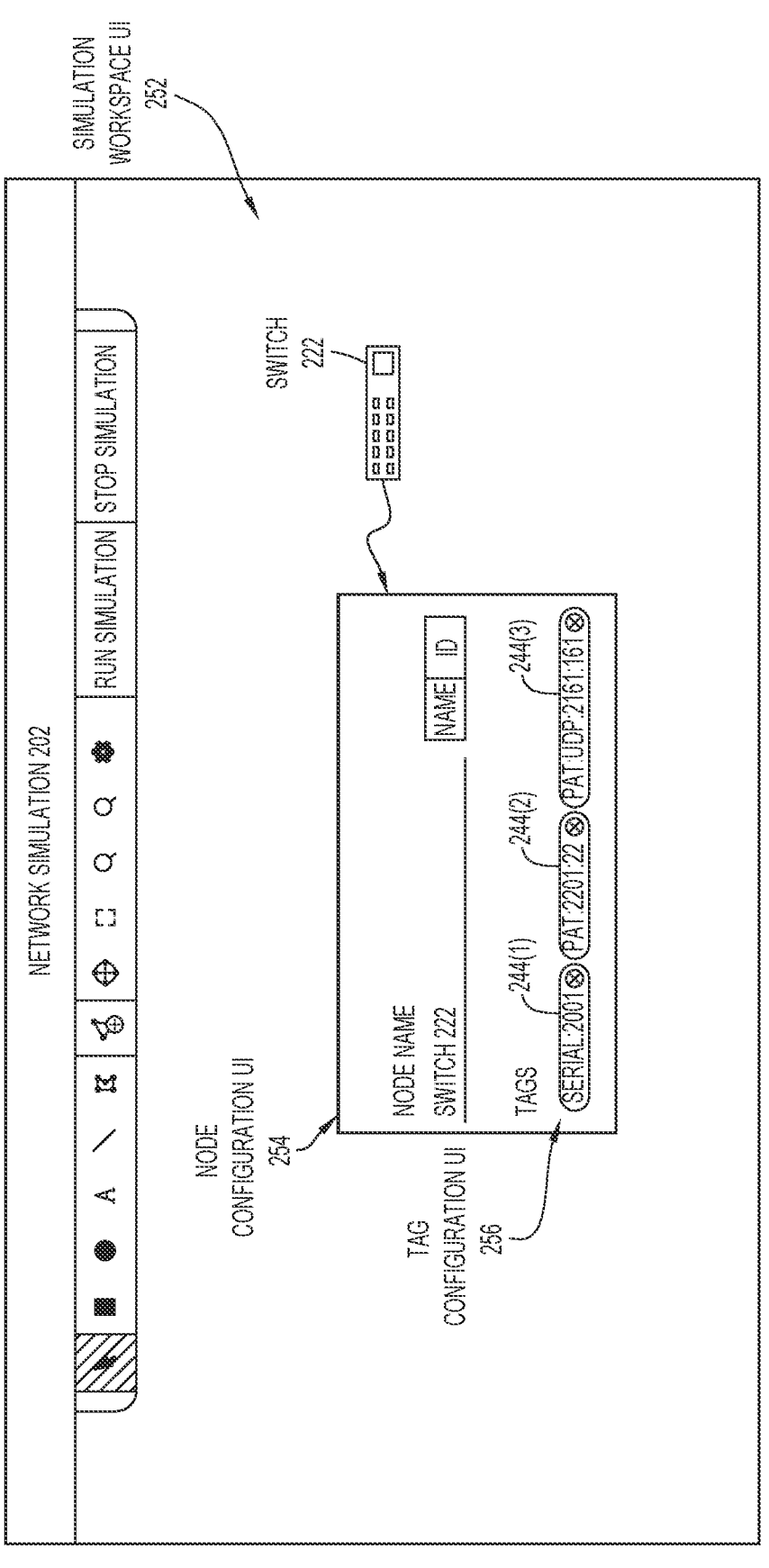
FIG. 2 is a diagram illustrating example user interface screens that may be utilized to configure one or more tags for simulation nodes in a network simulation, according to an example embodiment.

Referring to FIG. 2, FIG. 2 is a diagram illustrating example user interface screens that may be utilized to configure one or more tags for simulation nodes in a network simulation, according to an example embodiment. FIG. 2 illustrates an example UI screen 200 that may be utilized for configuring and operating a network simulation, such as a network simulation 202, as illustrated in FIG. 2, that can be configured, via a simulation workspace UI 252, with a given simulation node 222, which can be facilitated via UI logic 124 of controller 120. For purposes of the present example, simulation node 222 may be a switch provided for the network simulation 202.

As shown in FIG. 2, a node configuration UI 254 (provided via UI logic 124) can be opened or accessed for simulation node 222 through a variety of UI techniques, such as a user (that is configuring the network simulation 202) performing a mouse right-click on the simulation node 222, navigating through one or more sub-menus, or the like. Among other information for the simulation node 222 that can be configured through the node configuration UI 254, such as the name of the node within the simulation, an IP address for the node, etc., one or more tags may be configured for the node through a tag configuration UI 256, as shown in FIG. 2. For example, as shown in FIG. 2, three tags 244(1), 244(2), and 244(3) can be configured for the simulation node 222 via the node configuration UI. In one example, tags 244(1), 244(2), and 244(3) may be considered "hard" tags configured for simulation node 222.

In various embodiments, tag configuration performed via tag configuration UI 256 can be performed through a variety of techniques, such as through a drop-down submenu (not shown), through textual input of a given tag provided via tag configuration UI 256, selecting a tag from a list of, potentially editable, preconfigured tags that may be provided for a given simulation node type (e.g., a particular type of simulation node may have a list of preconfigured tags that can be applied to the particular simulation node, potentially editable and/or potentially preconfigured with certain port number information), combinations thereof, and/or the like. In at least one embodiment, one or more default tags may be automatically provided for certain types of simulation nodes, which can be removed and/or edited by a user upon including an instance of the type of simulation node in a given network simulation.

Referring to FIG. 3, FIG. 3 is a flow chart depicting a method 300 associated with operations that may be performed in order to utilize simulation node tags within a network simulation, according to an example, embodiment. In at least one embodiment, method 300 may be performed via a simulation controller, such as controller 120 of network simulation system 110, as shown in FIG. 1A.

As shown at 302, the method may include obtaining, by a controller of a network simulation (e.g., controller 120), a tag for a simulation node included in the network simulation in which the tag comprises a first tag field indicating an action that is to be performed by the controller as part of the network simulation on behalf of the simulation node and one or more second tag fields indicating parameters for the action that is to be performed by the controller. At 304, the method may include performing the action by the controller as identified via the first tag field based on the parameters indicated in the one or more second tag fields.

In at least one embodiment, the first tag field may indicate that a rule is to be configured for a firewall that facilitates connection of the simulation node included in the network simulation with an external network and the one or more second tag fields may indicate parameters associated with the rule, such that the action may include configuring the rule for a firewall based on the parameters indicated in the one or more second tag fields. In at least one embodiment, although not shown in FIG. 3, the method may further include determining that operation of the simulation node is stopped and removing (from the firewall) the rule configured for the firewall.

In at least one embodiment, the first tag field may indicate a port address translation rule and the one or more second tag fields may indicate that the controller is to analyze traffic for the simulation node in order to generate at least one additional tag for the simulation node (e.g., a "soft" tag) and configure at least one corresponding port address translation rule for the firewall based on the at least one additional tag.

In at least one embodiment, the first tag field may indicate a placement configuration for the simulation node and the one or more second tag fields indicate compute location at which the simulation node is to be instantiated for the network simulation. In at least one embodiment, the first tag field may indicate a temporal configuration for the simulation node and the one or more second tag fields indicate temporal information indicating when the simulation node is to be instantiated for the network simulation.

Figure 4:
FIG. 4 illustrates a hardware block diagram of a computing device configured to perform functions associated with operations discussed in connection with embodiments herein.

Referring to FIG. 4, FIG. 4 illustrates a hardware block diagram of a computing device 400 that may perform functions associated with operations discussed herein in connection with the techniques described for embodiments herein. In various embodiments, a computing device or apparatus, such as computing device 400 or any combination of computing devices 400, may be configured as any entity/entities in order to perform operations of the various techniques discussed for embodiments herein, such as any elements, functions, etc. discussed for embodiments herein (e.g., controller 120, external device 180(1), etc.).

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein. In least one embodiment, control logic 420 can be configured to include UI logic 124, simulation logic 122, and snooper logic 132 of controller 120.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a controller of a network simulation, a tag for a simulation node included in the network simulation, wherein the tag comprises: a first tag field indicating an action that is to be performed by the controller as part of the network simulation on behalf of the simulation node; and one or more second tag fields indicating parameters for the action that is to be performed by the controller; and performing the action by the controller as identified via the first tag field based on the parameters indicated in the one or more second tag fields.

In at least one instance, the first tag field indicates that a rule is to be configured for a firewall that facilitates connection of the simulation node included in the network simulation with an external network and the one or more second tag fields indicate parameters associated with the rule, the method further comprising: configuring the rule for the firewall based on the parameters indicated in the one or more second tag fields. In at least one instance, the first tag field indicates a port address translation rule and the one or more second tag fields indicate a first port of the firewall that is to be accessible by the external network and a second port of the firewall that is to interface with the simulation node included in the network simulation. In at least one instance, the one or more second tag fields further indicate a protocol type associated with the port address translation rule.

In at least one instance, the first tag field indicates a port address translation rule and the one or more second tag fields indicate that the controller is to analyze traffic for the simulation node in order to generate at least one additional tag for the simulation node and configure at least one corresponding port address translation rule for the firewall based on the at least one additional tag.

In at least one instance, the first tag field indicates a serial access rule and the one or more second tag fields indicate a first port of the firewall that is to be opened for the firewall and a second port that is a serial port of the simulation node included in the network simulation.

In at least one instance, the obtaining includes obtaining the tag upon operation of the simulation node for the network simulation.

In at least one instance, the method may further include determining that operation of the simulation node is stopped; and removing the rule configured for the firewall.

In at least one instance, the first tag field indicates a placement configuration for the simulation node and the one or more second tag fields indicate compute location at which the simulation node is to be instantiated for the network simulation. In at least one instance, the first tag field indicates a temporal configuration for the simulation node and the one or more second tag fields indicate temporal information indicating when the simulation node is to be instantiated for the network simulation.

In at least one instance, first tag field is a first text string and the one or more second tag fields are one or more corresponding second text strings in which the first text string and each of the one or more corresponding second text strings are separated by a delimiting character.

Variations and Implementations

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items.

For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a controller of a network simulation, a tag for a simulation node included in the network simulation, wherein the tag comprises:
a first tag field indicating an action that is to be performed by the controller as part of the network simulation on behalf of the simulation node; and
one or more second tag fields indicating parameters for the action that is to be performed by the controller; and
performing the action by the controller as identified via the first tag field based on the parameters indicated in the one or more second tag fields.

2. The method of claim 1, wherein the first tag field indicates that a rule is to be configured for a firewall that facilitates connection of the simulation node included in the network simulation with an external network and the one or more second tag fields indicate parameters associated with the rule, the method further comprising:
configuring the rule for the firewall based on the parameters indicated in the one or more second tag fields.

3. The method of claim 2, wherein the first tag field indicates a port address translation rule and the one or more second tag fields indicate a first port of the firewall that is to be accessible by the external network and a second port that is to interface with the simulation node included in the network simulation.

4. The method of claim 3, wherein the one or more second tag fields further indicate a protocol type associated with the port address translation rule.

5. The method of claim 2, wherein the first tag field indicates a port address translation rule and the one or more second tag fields indicate that the controller is to analyze traffic for the simulation node in order to generate at least one additional tag for the simulation node and configure at least one corresponding port address translation rule for the firewall based on the at least one additional tag.

6. The method of claim 2, wherein the first tag field indicates a serial access rule and the one or more second tag fields indicate a first port of the firewall that is to be opened for the firewall and a second port that is a serial port of the simulation node included in the network simulation.

7. The method of claim 2, wherein the obtaining includes obtaining the tag upon operation of the simulation node for the network simulation.

8. The method of claim 7, further comprising:
determining that operation of the simulation node is stopped; and
removing the rule configured for the firewall.

9. The method of claim 1, wherein the first tag field indicates a placement configuration for the simulation node and the one or more second tag fields indicate compute location at which the simulation node is to be instantiated for the network simulation.

10. The method of claim 1, wherein the first tag field indicates a temporal configuration for the simulation node and the one or more second tag fields indicate temporal information indicating when the simulation node is to be instantiated for the network simulation.

11. The method of claim 1, wherein the first tag field is a first text string and the one or more second tag fields are one or more corresponding second text strings in which the first text string and each of the one or more corresponding second text strings are separated by a delimiting character.

12. One or more non-transitory computer readable storage media encoded with instructions that, when executed by a processor, cause the processor to perform operations, comprising:
obtaining, by a controller of a network simulation, a tag for a simulation node included in the network simulation, wherein the tag comprises:
a first tag field indicating an action that is to be performed by the controller as part of the network simulation on behalf of the simulation node; and
one or more second tag fields indicating parameters for the action that is to be performed by the controller; and
performing the action by the controller as identified via the first tag field based on the parameters indicated in the one or more second tag fields.

13. The media of claim 12, wherein the first tag field indicates that a rule is to be configured for a firewall that facilitates connection of the simulation node included in the network simulation with an external network and the one or more second tag fields indicate parameters associated with the rule, the media further comprising instructions that, when executed by the processor, cause the processor to perform further operations, comprising:
configuring the rule for the firewall based on the parameters indicated in the one or more second tag fields.

14. The media of claim 13, wherein the first tag field indicates a port address translation rule and the one or more second tag fields indicate a first port of the firewall that is to be accessible by the external network and a second port that is to interface with the simulation node included in the network simulation.

15. The media of claim 14, wherein the one or more second tag fields further indicate a protocol type associated with the port address translation rule.

16. The media of claim 13, wherein the first tag field indicates a serial access rule and the one or more second tag fields indicate a first port of the firewall that is to be opened for the firewall and a second port that is a serial port of the simulation node included in the network simulation.

17. A system comprising:

at least one memory element for storing data; and at least one processor for executing instructions associated with the data, wherein executing the instructions causes the system to perform operations, comprising:

obtaining, by a controller of a network simulation, a tag for a simulation node included in the network simulation, wherein the tag comprises:

a first tag field indicating an action that is to be performed by the controller as part of the network simulation on behalf of the simulation node; and one or more second tag fields indicating parameters for the action that is to be performed by the controller; and performing the action by the controller as identified via the first tag field based on the parameters indicated in the one or more second tag fields.

18. The system of claim 17, wherein the first tag field indicates that a rule is to be configured for a firewall that facilitates connection of the simulation node included in the network simulation with an external network and the one or more second tag fields indicate parameters associated with the rule, wherein executing the instructions cause the system perform further operations, comprising:

configuring the rule for the firewall based on the parameters indicated in the one or more second tag fields.

19. The system of claim 18, wherein the first tag field indicates a port address translation rule and the one or more second tag fields indicate a first port of the firewall that is to be accessible by the external network and a second port that is to interface with the simulation node included in the network simulation.

20. The system of claim 18, wherein the first tag field indicates a serial access rule and the one or more second tag fields indicate a first port of the firewall that is to be opened for the firewall and a second port that is a serial port of the simulation node included in the network simulation.

\* \* \* \* \*